United States Patent [19]

Dang et al.

[11] Patent Number: 5,535,188
[45] Date of Patent: Jul. 9, 1996

[54] DATA SECURITY PROTECTION FOR INFORMATION RECORDED ON A REWRITABLE STORAGE MEDIUM USING A WRITE-ONCE READ-MANY STORAGE MEDIUM

[75] Inventors: Chi H. Dang; Chi T. Dang, both of Tucson, Ariz.

[73] Assignee: International Business Machines Corporation, Armonk, N.Y.

[21] Appl. No.: 316,997

[22] Filed: Oct. 3, 1994

[51] Int. Cl.$^6$ .................. G11B 7/28; H04L 9/00
[52] U.S. Cl. .................. 369/84; 369/13; 369/54; 369/275.2; 380/3; 380/4; 380/25
[58] Field of Search .................. 369/13, 84, 14, 369/275.2, 54; 380/25, 4, 3; 395/726

[56] References Cited

U.S. PATENT DOCUMENTS

| | | | |
|---|---|---|---|
| 4,960,982 | 10/1990 | Takahira | 369/14 |
| 5,249,231 | 9/1993 | Covey et al. | 380/4 |
| 5,282,247 | 1/1994 | McLean et al. | 380/4 |
| 5,311,595 | 5/1994 | Bjerrum et al. | 380/25 |
| 5,341,429 | 8/1994 | Stringer et al. | 380/4 |

OTHER PUBLICATIONS

Computer Technology Review, "Super Hash Serves Up Super Privacy On The Internet", by Dave Trowbridge, vol. XV, No. 4, Apr. 1995, pp. 29, 38 and 42.

*Primary Examiner*—Georgia Y. Epps
*Assistant Examiner*—Kim-Kwok Chu
*Attorney, Agent, or Firm*—D. A. Shifrin

[57] ABSTRACT

A data storage system provides the data security afforded by write-once, read-many storage media and the lower cost afforded by rewritable storage media. To effectively write protect data, the system generates a protective code based upon the data to be stored, stores the protective code and a data identification on WORM media and stores the data and the location of the protective code on rewritable media. When the data is later read, it is verified by reading the data, generating a new protective code from the data and comparing the new code with the original code. Any difference between the two protective codes indicates that the data has been altered.

10 Claims, 3 Drawing Sheets

DATA SECURITY PROTECTION FOR INFORMATION RECORDED ON A REWRITABLE STORAGE MEDIUM USING A WRITE-ONCE READ-MANY STORAGE MEDIUM

TECHNICAL FIELD OF THE INVENTION

The present invention relates to data storage, and in particular, to protecting data which has been recorded onto rewritable media.

BACKGROUND OF THE INVENTION

Rewritable/erasable media, such as magnetic disks and tapes and magneto-optical disks, are relatively inexpensive technologies for storing computer data. However, the ability to erase and rewrite data stored on the media renders such technologies deficient when it is desired to store permanent information which should not be altered, such as legal documents, financial and insurance records, and the like. Write-protect mechanisms can be used to prevent accidental erasure or alteration of data but the mechanisms are easily reversed and are not adequate to prevent intentional erasure or alteration.

Write-once, read-many (WORM) media, such as ablative and bubble/pit optical disks, offer permanence for the data recorded thereon. However, WORM media is considerably more expensive than rewritable media and cannot also be used to record non-permanent data.

SUMMARY OF THE INVENTION

In view of the foregoing, it is an object of the present invention to provide a data storage system which takes advantage of the low cost of rewritable media and the permanence of WORM media.

This object and others are achieved in this invention by generating a protective code based upon the data to be stored, storing the protective code with data identification on WORM media and storing the data and the location of the protective code on rewritable media. When the data is later read, it can be verified by reading the data from the rewritable media, generating a new protective code from the data, reading the original code from the WORM media and comparing the new code with the original code. Any difference between the two protective codes indicates that the data has been altered.

The foregoing and other features and advantages of the invention will be apparent from the following more particular description of preferred embodiments of the invention, as illustrated in the accompanying drawings.

DETAILED DESCRIPTION OF THE INVENTION

Figure 1:
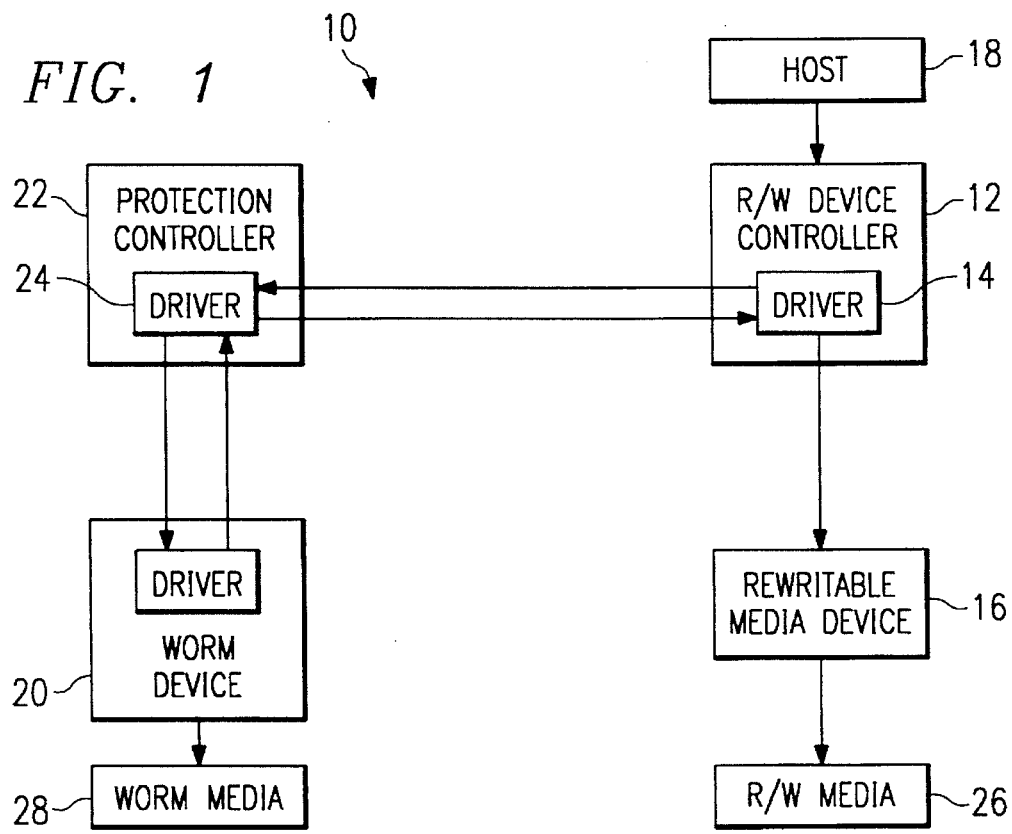
FIG. 1 is a functional block diagram of the present invention during a write operation.

FIG. 1 is a functional block diagram of a storage system 10 of the present invention during a write operation. A read/write device controller 12 includes a driver/code generator 14 to control a rewritable device 16, such as a magneto-optical (MO) disk drive, a magnetic disk drive or a magnetic tape drive. The control unit 12 is also interconnected to exchange data and commands with a host device 18. The system also includes a write-once, read-many (WORM) device 20, such as a WORM optical drive. If the system 10 is incorporated within an automated storage and retrieval library, the WORM device 20 and the rewritable device 16 are interconnected with a protection controller 22 which includes a driver 24 to control the WORM device 20. If the devices 16 and 20 are stand-alone units, they can each be interconnected with the host 18, without the protection controller 22. Moreover, for additional security, the driver code generator 14, the WORM device 20, or both can be located at a remote site.

The rewritable media 26 can be fixed media, such as a magnetic hard drive, or can be removable, such as a magnetic diskette, a magnetic tape cartridge or cassette, or an MO disk. The WORM media 28 is preferably a WORM optical disk.

Figure 3:
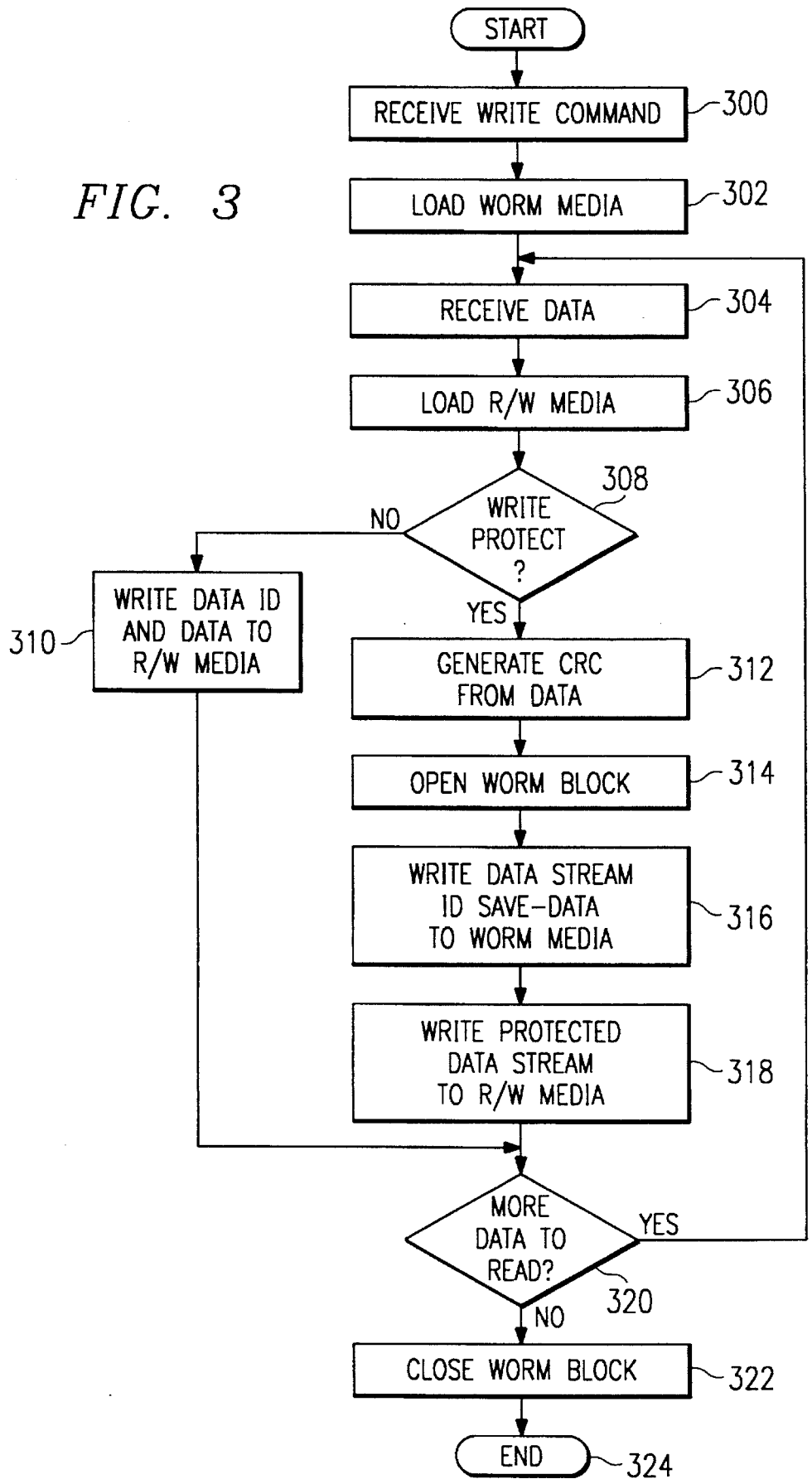
FIG. 3 is a flow chart of a write operation of the present invention.

Referring to the flow chart of FIG. 3, a protective write operation will now be described. When a write command from the host 18 is received by the control unit 12 (Step 300), the WORM media 28 is loaded into the WORM device 20 if it is not already present (Step 302). The data stream, comprising a data header and the data, is received from the host 18 (Step 304) and the appropriate rewritable media 26 is loaded into the rewritable device 16 (Step 306). The host 18 also notifies the device controller 12 whether the data is to be protected (Step 308). If not, the data and its identification are recorded on the rewritable media 26 in a conventional fashion (Step 310). If, however, the data is to be protected, the driver 14 generates a unique protective code from the data (Step 312). Because a cyclic-redundancy-code (CRC) is generally currently generated in most storage systems, it is preferred to use existing hardware and microcode to generate the CRC as the protective code. Other unique codes can also be generated. A "data stream ID", comprising the data stream volume ID, name and size, and the CRC (or other protective code), is transmitted to the protection controller 22.

A data block is then opened on the WORM media 28 (Step 314) and a "data stream ID save-ID", comprising the data stream ID, a library ID, the current date and information about any prior recorded versions of the data, is recorded (Step 316). A "data stream ID save-data location", comprising the library ID, the date, the WORM volume, the data file name and location and a record key, is then transmitted from the WORM device 20 through the protection controller 22 to the device controller 12 and recorded onto the rewritable media 26 along with the data stream itself (Step 318).

The process repeats until there is no more data to record (Step 320), at which time the data block on the WORM media 28 is closed (Step 322) and the operation terminates (Step 324).

Figure 2:
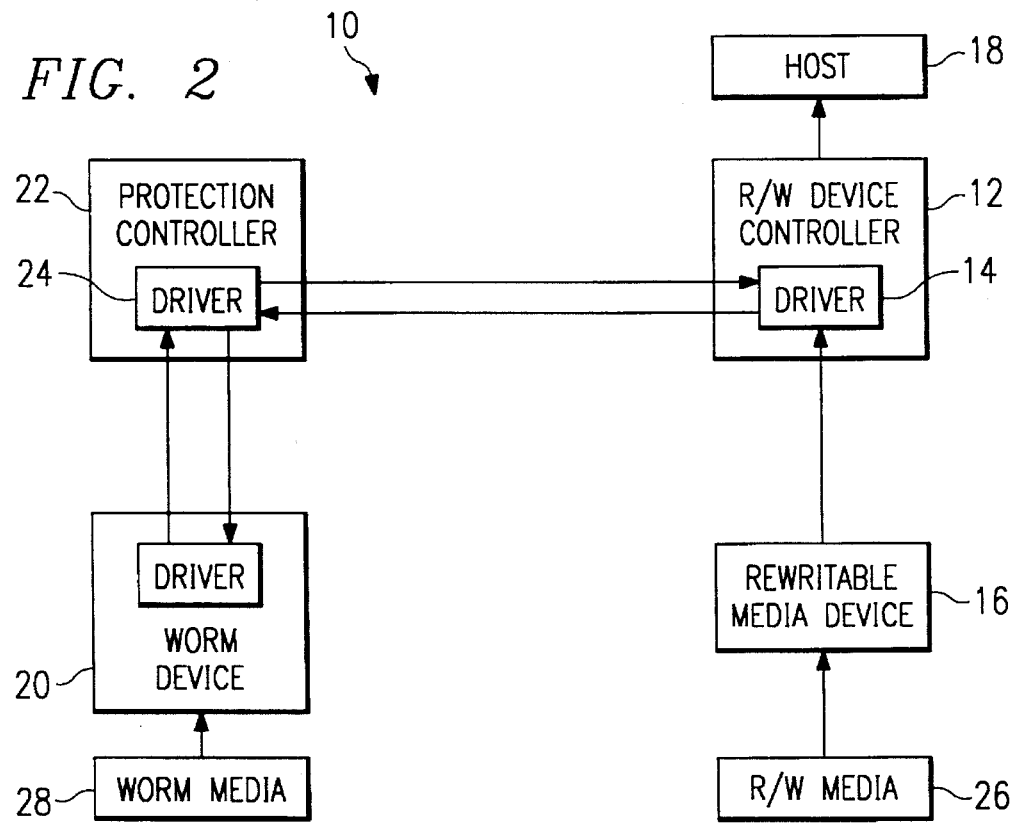
FIG. 2 is a functional block diagram of the present invention during a read and verify operation.
Figure 4:
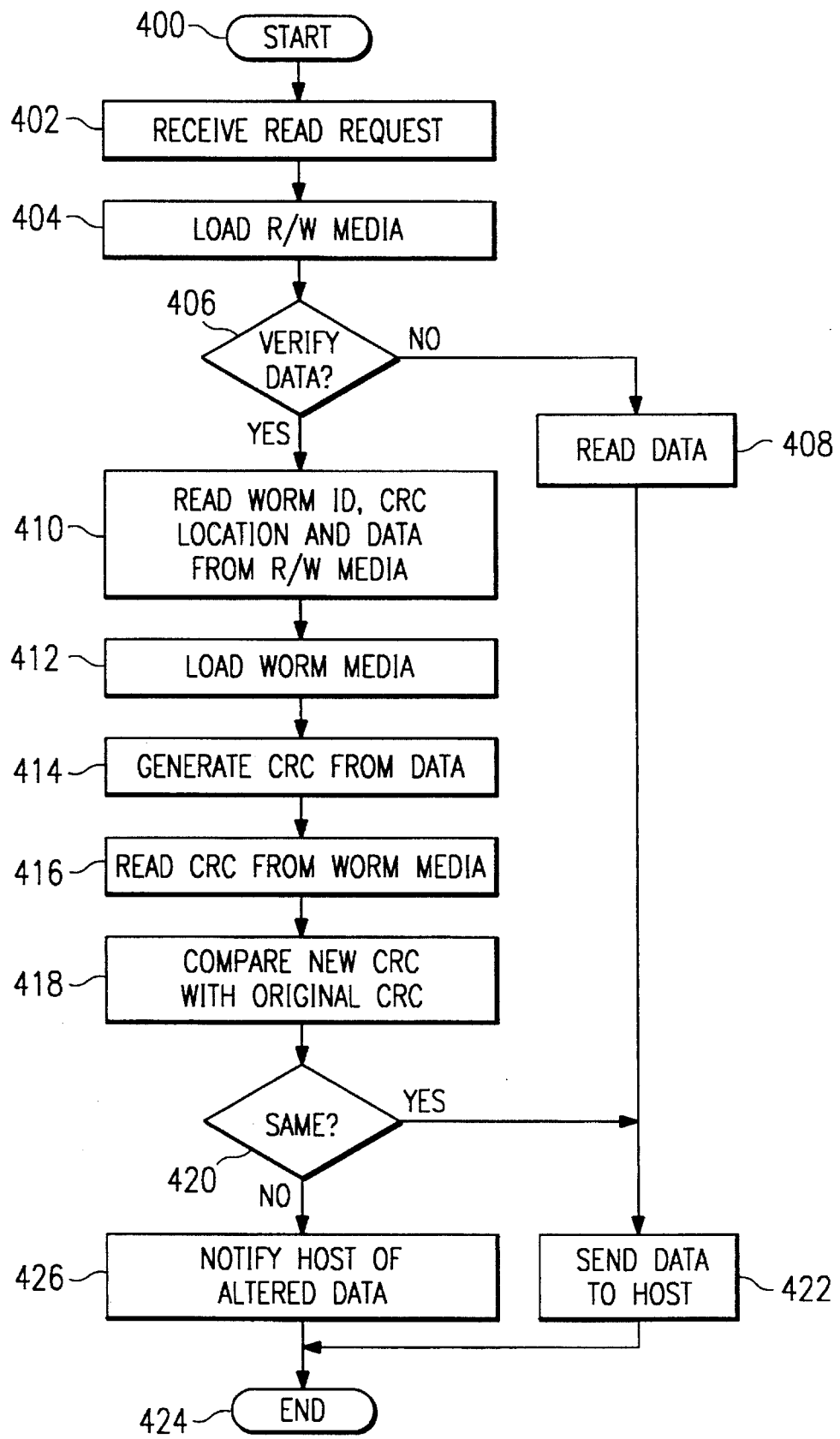
FIG. 4 is a flow chart of a read and verify operation.

FIG. 2 is a functional block diagram of the storage system 10 during a read and verify operation. A description of the read operation is made with reference to the flow chart of FIG. 4. When a read command from the host 18 is received by the device controller 12 (Step 402), the appropriate rewritable media 26 is loaded into the rewritable device 16 (Step 404) and a determination is made (Step 406) whether the data is to be verified. If not, the data stream is read from the rewritable media 26 (Step 408) and transmitted to the host device 18 (Step 422). If, however, the data is to be checked for possible alterations, the protected data stream, including the full WORM identification, is read from the rewritable media 26 (Step 410) and the appropriate WORM media 28 is loaded into the WORM device 20 if it is not already present (Step 412). The driver 14 then generates a new CRC from the data (Step 414). The saved data stream ID, including the original CRC, is read from the WORM media 28 (Step 416) and is compared with the newly generated CRC (Step 418). If the two codes are determined to be the same, the data is deemed to have been unaltered and is transmitted to the host 18 in fulfillment of the read request (Step 422). If, rather, the two codes are different, the host 18 is notified that the data had been modified between the time it was originally recorded and the time it is now being read (Step 426).

If it is desired to update previously recorded protected data, an override command is transmitted by the host 18. A new CRC is generated from the updated data and recorded on the WORM media 28. Preferably, the location of the location of the original CRC is also recorded with the new CRC, thereby providing an unalterable history of the data. Finally, the data itself is recorded onto the rewritable media 26 along with the CRC location and WORM identification.

Although, as previously noted, other protection codes can be employed, each CRC is sufficiently unique that the unalterability of protected data can be assured to about one byte in one-million terabytes.

By way of a cost comparison, when magnetic tape is used as the rewritable media, the cost is about $15 per megabyte, and when WORM optical is used as the WORM media, the cost is about $150 per megabyte. A CRC requires up to about 235 bytes for each 1024 bytes of user data in a 1259 byte block. Consequently, the overall cost of the composite storage is no more than $15+(235/1259)*$150 or about $40 per megabyte, far less expensive than relying on WORM media alone.

While the invention has been particularly shown and described with reference to preferred embodiments thereof, it will be understood by those skilled in the art that various changes in form and details may be made therein without departing from the spirit and scope of the invention.

What is claimed is:

1. A data storage system, comprising:

a code generator coupled to receive selected data to be recorded and for generating a first protective code therefrom;

a first recording device capable of recording the selected data onto rewritable media and for reading the selected data therefrom;

a second recording device capable of recording the first protective code on non-rewritable media and for reading the first protective code therefrom;

said code generator further coupled to receive the selected data read from said first recording device and for generating a second protective code therefrom; and a code comparator coupled to receive the first protective code read from said second recording device and to receive the second protective code generated by said code generator and for generating an alert signal if the second protective code differs from the first protective code, indicating that the selected data was altered between the time it was first recorded onto the rewritable media and the time it was read therefrom.

2. The system of claim 1, wherein said first recording device comprises a magneto-optical drive.

3. The system of claim 1, wherein said first recording device comprises a magnetic tape drive.

4. The system of claim 1, wherein said second recording device comprises a write-once, read-many optical drive.

5. The system of claim 1, wherein the first and second protective codes each comprise a cyclic-redundancy-code.

6. A method for verifying that data stored on rewritable media has not been altered, comprising the steps:

receiving selected data to be stored;

generating a first protective code from the selected data;

recording the first protective code onto a non-rewritable media;

recording the selected data and the location of the first protective code onto a rewritable media;

receiving a request to read the selected data recorded onto the rewritable media;

reading the selected data and the location of the first protective code from the rewritable media;

generating a second protective code from the selective data read from the rewritable media;

reading the first protective code from the non-rewritable media;

comparing the second protective code with the first protective code; and generating an alert signal if the second protective code differs from the first protective code.

7. The method of claim 6, wherein said steps of generating first and second protective codes comprise the steps of generating first and second cyclic-redundancy-codes, respectively.

8. The method of claim 6, wherein said step of recording the selected data and the location of the first protective code onto a rewritable media comprises the step of recording the selected data and the location of the first protective code onto a magneto-optical disk.

9. The method of claim 6, wherein said step of recording the selected data and the location of the first protective code onto a rewritable media comprises the step of recording the selected data and the location of the first protective code onto a magnetic tape.

10. The method of claim 6, wherein said step of recording the first protective code onto a non-rewritable media comprises the step of recording the first protective code onto a write-once, read-many optical disk.

\* \* \* \* \*